United States Patent
Fang et al.

(10) Patent No.: US 10,609,644 B2
(45) Date of Patent: Mar. 31, 2020

(54) LOW POWER RECEIVER FOR WIRELESS COMMUNICATION

(71) Applicant: ZTE Corporation, Shenzhen (CN)

(72) Inventors: Yonggang Fang, San Diego, CA (US); Bo Sun, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 15/591,104

(22) Filed: May 9, 2017

(65) Prior Publication Data
US 2017/0332327 A1    Nov. 16, 2017

(30) Foreign Application Priority Data

May 10, 2016   (WO) ................ PCT/CN2016/081548

(51) Int. Cl.
*H04W 84/12* (2009.01)
*H04W 52/02* (2009.01)
*H04L 5/00* (2006.01)
*H04W 16/14* (2009.01)
*H04L 27/26* (2006.01)
*H04W 92/10* (2009.01)

(52) U.S. Cl.
CPC ....... *H04W 52/0229* (2013.01); *H04L 5/0007* (2013.01); *H04W 16/14* (2013.01); *H04L 27/2613* (2013.01); *H04W 84/12* (2013.01); *H04W 92/10* (2013.01)

(58) Field of Classification Search
None
See application file for complete search history.

(56) References Cited

U.S. PATENT DOCUMENTS

| | | | | |
|---|---|---|---|---|
| 2012/0155349 A1* | 6/2012 | Bajic | ....................... | H04W 4/80 370/311 |
| 2015/0092649 A1* | 4/2015 | Wu | .................... | H04W 52/0229 370/311 |
| 2017/0374621 A1* | 12/2017 | Itagaki | .................. | H04W 84/12 |

FOREIGN PATENT DOCUMENTS

CN            103210600            7/2013

OTHER PUBLICATIONS

Chinese Office Action for Chinese Patent Application No. 20170325358. 5, dated May 28, 2019 (7 pages).

* cited by examiner

*Primary Examiner* — Kouroush Mohebbi
(74) *Attorney, Agent, or Firm* — Perkins Coie LLP

(57) ABSTRACT

A power saving station integrates a low power consumption wake-up receiver with wideband wireless of main radio. The low power wake-up receiver of power saving station receives a wake-up request signal sent from the wireless network and wakes up the main radio of the station to communicate with the wireless network over wideband frequency channel. The wake-up request signal is transmitted over a narrow band frequency channel and can be addressed to a single station or multiple of stations via OFDMA in wideband channel.

32 Claims, 12 Drawing Sheets

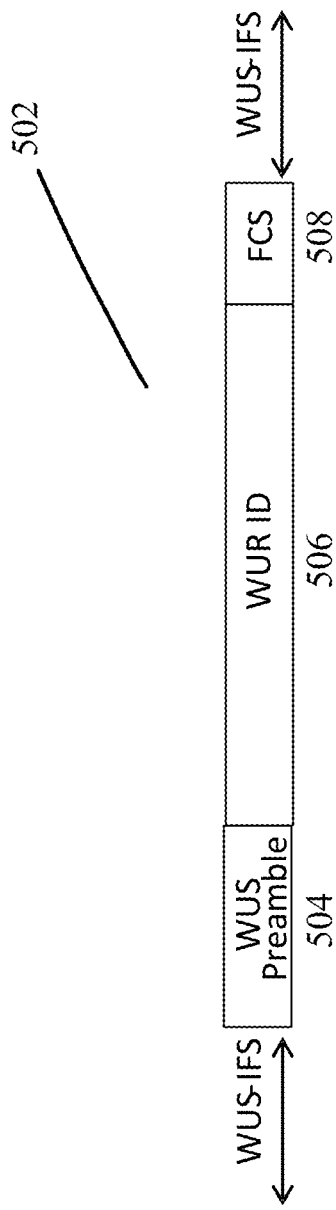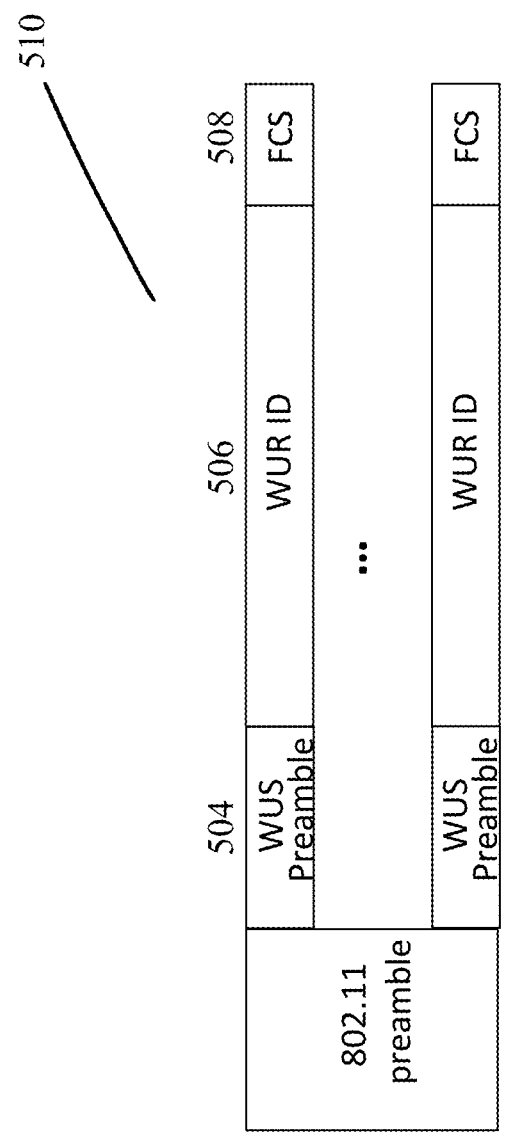
FIG. 5A
FIG. 5B

LOW POWER RECEIVER FOR WIRELESS COMMUNICATION

CROSS REFERENCE TO RELATED APPLICATIONS

This patent document claims the benefit of priority under 35 U.S.C. § 119(a) and the Paris Convention of International Patent Application No. PCT/CN2016/081548, filed on May 10, 2016. The entire content of the before-mentioned patent application is incorporated by reference as part of the disclosure of this patent document.

BACKGROUND

This patent document relates to wireless communications.

Wireless communication systems can include a network of one or more access points (AP) to communicate with one or more wireless stations (STA). An AP can emit radio signals that carry management information, control information or users' data to one or more wireless stations, and a station can also transmit radio signals to the access point in the same frequency channel via time division duplexing (TDD) or in a different frequency channel via frequency division duplexing (FDD).

IEEE 802.11 is an asynchronous time division duplexing technology for operation of a wireless local area network (WLAN). The basic unit of WLAN is a basic service set (BSS). An infrastructure BSS is the BSS with stations that communicate through associating with an Access Point (AP) to connect to the wired network or Internet. In a BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies for, among other things, a new power saving mechanism for reducing both power consumption of wireless devices and access latency.

In one example aspect, a method of wireless communication is disclosed. The method includes transmission of wake-up request signal over a narrow band frequency channel to a low power wake-up receiver to wake-up the main wireless communication module in the sleep mode of power saving station.

In another example aspect, an apparatus for wireless communication is disclosed. The apparatus includes a low power consumption wake-up receiver in the power saving device that is used to wake up the main wireless communication module from its sleep mode. The low power consumption wake-up receiver can receive the wake-up request signal from the wireless network over the narrow band frequency channel to wake-up the main radio.

In yet another example aspect, a method of a power saving mechanism is disclosed. The method includes a mechanism to embed multiple wake-up request messages in multiple narrow band sub-channels and transmit them simultaneously over wideband channel to wake up multiple power saving stations for multi-user transmissions.

In another example aspect, a method of power saving mechanism is disclosed. The method includes the mechanism to configure the low power consumption wake-up receiver to operate on specified narrow band channel for detecting the wake-up request signal associating with a BSS. Once the wake-up signal with the unique sequence to the BSS is detected, the wake-up receiver should detect and decode the following signal fields.

In another example aspect, a method of power saving mechanism is disclosed. The method includes the mechanism that the wireless network can use the wake-up request signal with a broadcast address to wake-up all the power saving stations in the sleep mode in the BSS.

In yet another example aspect, a method of wireless communication, implemented at a wireless network controller device in a wireless network that includes a wireless device is disclosed. The method includes setting up a wideband communication channel with the wireless device for data communication, determining, during operation of the wideband communication channel that the wireless device is in a power saving mode and is to be woken up, and transmitting, upon the determining, over a narrowband communication channel having a narrowband communication bandwidth lower than that of the wideband communication channel, a wake-up request signal to the wireless device to wake-up the wireless device for communication over the wideband communication channel. The wake-up request signal includes a preamble sequence which uniquely identifies the wake-up request signal as being for the wideband communication network, an identifier of the wireless device for whom the wake-up request signal is intended, and an error correction sequence facilitating error-free reception of the wake-up request signal.

In another example aspect, a wireless controller apparatus operable in a wireless network that includes a wireless device is disclosed. The apparatus includes a memory for storing instructions, a processor, a wideband air interface for communication over a wideband communication channel, and a narrowband air interface for communication over a narrowband communication channel. The processor reads instructions from the memory and performs the operations of determining, during operation of the wideband communication channel that the wireless device is in a power saving mode and is to be woken up, and performing transmission, upon the determining, over the narrowband air interface, a wake-up request signal to the wireless device to wake-up the wireless device for communication over the wideband air interface. The wake-up request signal includes a preamble sequence which uniquely identifies the wake-up request signal as being for the wideband communication network, an identifier of the wireless device for whom the wake-up request signal is intended, and an error correction sequence facilitating error-free reception of the wake-up request signal.

In yet another aspect, a method of wireless communication, implemented by a wireless device for operation in a wireless network, includes operating a wideband interface for data communication, wherein the wideband interface is operated in at least two states, including an awake state in which data transfer occurs over the wideband interface and a sleep state in which data transfer is disabled on the wideband interface, operating a narrowband interface in a receive-only mode for receiving control message communication, wherein the narrowband interface operates at a bandwidth substantially lower than that of the wideband interface, and transitioning, selectively based on a wake-up request message received on the narrowband interface, the wireless device from the sleep state to the awake state.

Details of the above aspects and their implementations, and other features, are set forth in the accompanying drawings, the description and the claims.

BRIEF DESCRIPTION OF THE DRAWINGS

FIGS. 5A-5B show an example of wake-up signal format.

DETAILED DESCRIPTION

This document describes techniques, mechanisms, devices, and systems for improving the power saving performance of wireless devices and reducing the access latency of power saving devices from the sleep mode in contention based wireless communications.

In one example aspect, a method of wireless communication is disclosed, including transmission of wake-up request signal over a narrow band frequency channel to a low power consumption wake-up receiver to wake-up the main wireless communication module in the sleep mode.

In another example aspect, an apparatus for wireless communication is disclosed. The apparatus includes a low power consumption wake-up receiver in the power saving device that is used to wake up the main wireless communication module from its sleep. The low power consumption wake-up receiver can receive the wake-up request signal from the wireless network over the narrow band frequency channel and wake-up the main radio once such request is received.

In yet another example aspect, a method of power saving mechanism is disclosed. The method includes mechanism to embed multiple wake-up request messages in multiple narrow band sub-channels and transmit them simultaneously over wideband channel to wake up multiple power saving stations for multi-user transmissions.

In another example aspect, a method of power saving is disclosed. The method includes a mechanism to configure the low power consumption wake-up receiver to operate on specified narrow band channel for detecting the wake-up request signal associating with a BSS. Once the wake-up signal with the unique sequence to the BSS is detected, the wake-up receiver should detect and decode the following signal fields.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
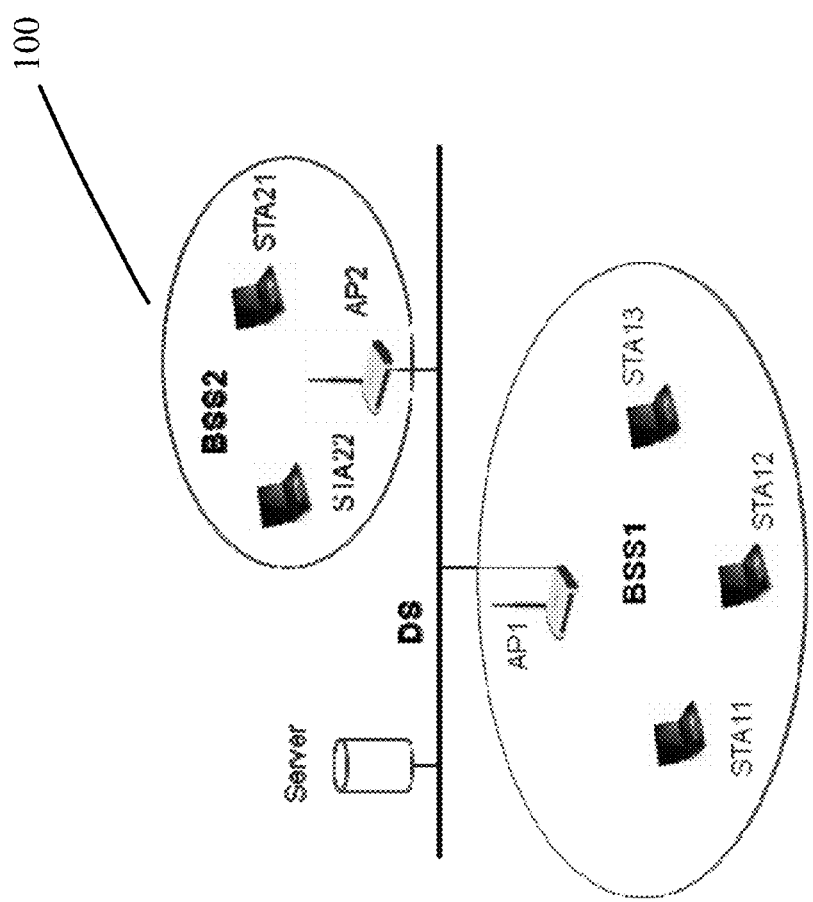
FIG. 1 shows an example of infrastructure BSS in a wireless communication system.

FIG. 1 illustrates an example of a wireless communication system 100. BSS1 and BSS2 are infrastructure BSSes. BSS1 contains one access point (AP1) and several non-AP stations, STA11, STA12, and STA13. The AP1 maintains associations with, e.g., maintains a wireless connectivity or reserves wireless communication resources for, stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a switch/gateway through a distribution system (DS). In 802.11 terminology, a central station being associated with other stations and performing management of the BSS is referred to as an Access Point (AP). A BSS built around an AP is called an infrastructure BSS. Two or more BSSes could be interconnected via DS and form as Enhanced Service Set (ESS). An ESS may be managed and controlled by an access controller (AC).

IEEE 802.11 is a TDM based asynchronous technology. The AP, however, does not allocate dedicated time slots for the transmissions between AP and STAs. All the transmissions no matter management frames, control signaling or data frames have to go through medium contention prior to sending their transmissions.

IEEE 802.11 is usually said to consume more power on the mobile devices. It is not only because of IEEE 802.11 has weak power saving mechanism, but also of its ultra wide bandwidth and implementation. As WiFi technology could be used in many different IoT types of devices for wireless access, it is beneficial to use a new mechanism to reduce the power consumption in systematic and network levels.

The current IEEE 802.11 power saving is similar to the power saving mechanism used in cellular (paging cycle). In order to save power consumption, IEEE 802.11 network implements a power saving (PS) mechanism, which includes the sleep period and the wake-up period. In the sleep period, the power saving station is allowed to go to deep sleep so as to save the power consumption. In the wake-up period, the power saving station is active listening to the transmission from the network.

Figure 2:
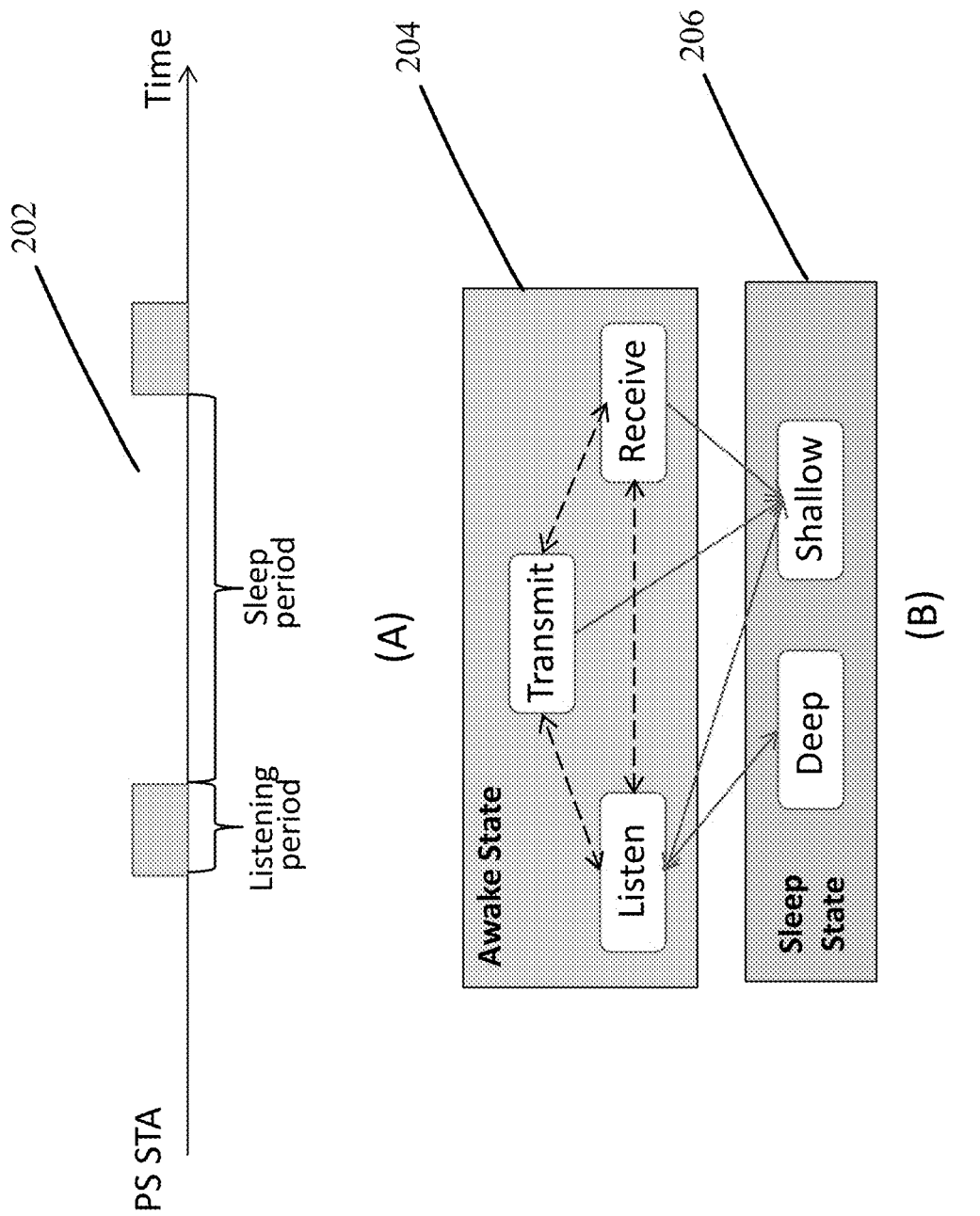
FIG. 2 shows an example of existing power saving operation in wireless communication.

FIG. 2 shows an example of the power saving mechanism used in the IEEE 802.11 network or other wireless networks. A power saving station is designed to have two states:

Awake State:

In the awake state (204), the power saving station could be in listening mode, transmit mode or receiving mode.

The transmit mode is the sub-state that the power saving station is sending a PPDU.

The receiving mode is the sub-state that the power saving station is receiving a PPDU from other station.

The listening mode is the sub-state that the power saving station only enables the carrier sensing module to detect the Wi-Fi preamble signal via CCA mechanism.

Sleep State:

the power saving station will go to sleep in the state (206) which consists of two sub-states (or modes):

the shallow sleep mode: the power saving station will turn off transmitter and receiver circuit and leave baseband modem and main processor on for fast switching to the listening mode.

the deep sleep mode: the power saving station will turn off all the circuitry except for the slow clock for further reducing power consumption.

As shown along the timeline 202, a power saving station is configured to periodically switch between sleep period and wake-up period for listening to the transmission from the AP. If a power saving station receives detect a preamble and/or decode the message from the AP in the wake-up period that indicates there is scheduled DL data, it will remain wake-up to receive the following DL data frames. Otherwise, the power saving station will go back to sleep until the next wake-up period.

As the power station only monitors the wireless channel on the wake-up period, the AP of the BSS shall only transmit the control or user data frames to the power saving station in its wake-up period.

To avoid congestion on particular period, the wake-up period of a power saving station should be evenly distributed in time domain especially for dense deployment of WLANs. The power saving station can negotiate with the AP the target wakeup time (TWT) individually during the association and/or at any time so that different power saving station could be able to wake up at different TWT serving period.

On the other hand, in order to make transmission efficiently, the AP could group a couple of power saving stations together and set their TWT to the same time. Therefore the AP could schedule and transmit the multiple paging (or power saving polling) messages to the group of power saving stations together at the same time.

This power saving mechanism could save the power consumption of stations but it encounters other issues.

The power saving performance highly depends on the ratio of sleep period in the total duty cycle (i.e. sleep period+wake-up period). The longer sleep period, the more power saving could be achieved. However the longer sleep period would cause the access delay as the power saving station would not listen to any paging message during its sleep period even the AP wants to reach the power saving station immediately for high priority message or buffered data. Therefore, to balance the power saving performance and access latency, the duty cycle of wake-up should not be set too long.

The second issue causing more power consumption in IEEE 802.11 is the operating channel bandwidth. To reduce the implementation cost, the IEEE 802.11 only supports single carrier with wide bandwidth such as 20 MHz, 40 MHz or 80 MHz. The minimum channel bandwidth is 20 MHz for the primary channel. When the IEEE 802.11 station is powered on, its transmitter and receiver have to operate on the entire channel bandwidth. Such operation could fully use the channel for data transmission but might not be good for the power saving. When the power saving station enters the wake-up period to check whether there is scheduled DL data from AP, the receiver has to operate on the entire bandwidth, and its wideband radio circuit would consume a lot of power especially when frequent wake-ups.

This document discloses some embodiments which introduce a separate low power wake-up receiver module in the wireless device to control the operation of main IEEE 802.11 module.

Figure 3A:
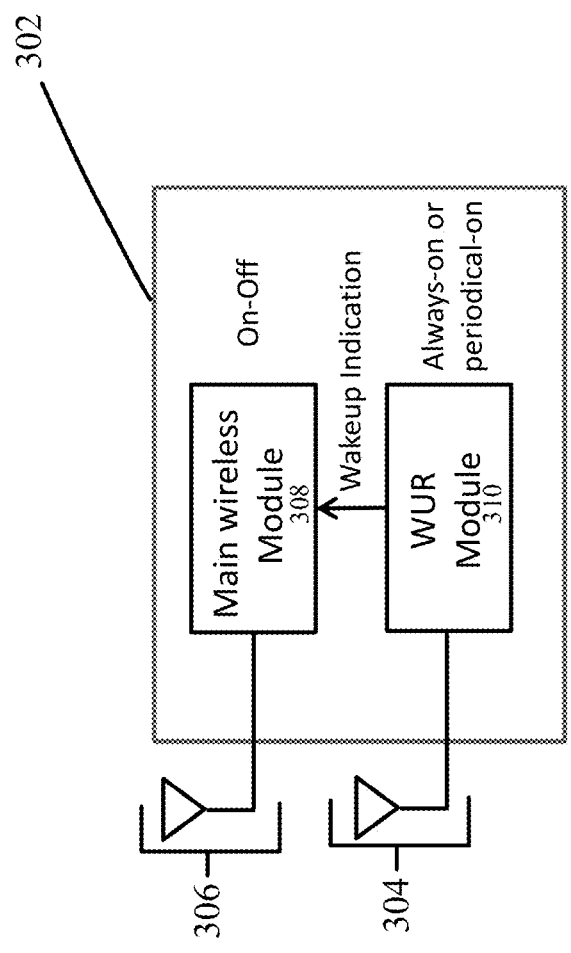
FIGS. 3A-3B show an example of low power consumption receiver in power saving device.

FIG. 3A shows an example of wireless device 302 which consists of:

a) a main wireless communication module 308, such as 802.11 air interface component. The main wireless communication module is responsible to transmit or receive the regular control, or user data over the wide bandwidth wireless interface;

b) a low power wake-up receiver (WUR) module 310 that is operating on the narrow band channel to receive the wake-up request signal (WUS) from the network and to wake-up the main wireless communication module in the sleep mode. The modules 308, 310 may share antenna or may have separate antennas 304, 306.

Figure 3B:
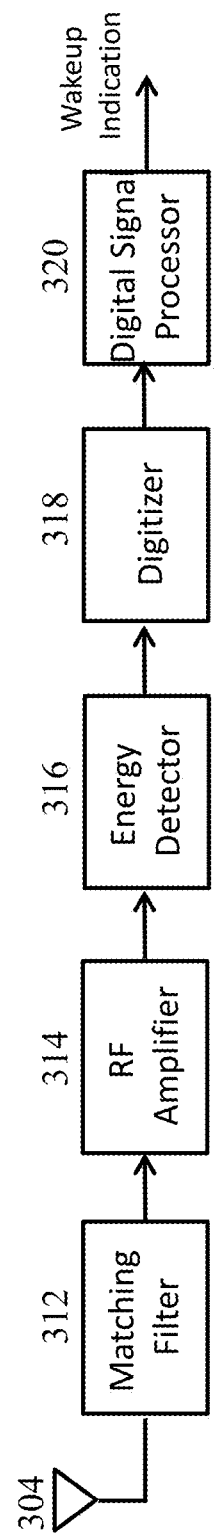

FIG. 3B shows an example of functional blocks of low power consumption wake-up receiver 310. The matching filter 312 operates on radio frequency channel specified for the lower power consumption WUR to filter out the out-band interference from the received signal on the narrow band of WUR. The RF amplifier module 314 boosts the received radio signal in the narrow band for the energy detection. The energy detector 316 and digitizer 318 modules are used to convert the received analog signal to digital signal for digital signal processor 320. If the digital signal processor detects the received signal is the wake-up request signal, it will generate the wake-up indication to wake-up the main wireless communication module from the sleep mode.

The WUR module can operate in one of two modes:

A) always-on mode. In this mode, the WUR module is always-on to monitor the WUS over a narrow band operation channel and ready for decoding the WUS all the time;

B) period-on mode. In this mode, WUR module is periodically turned on at particular time to monitor and receive the WUS on the narrow band operation channel, while at other time, the WUR would go to sleep. Comparing to the "always-on" mode, the period-on mode would be able to reduce more power consumption for the device, but would cause more complex of implementation and increase the latency of wake-up control signal transmission.

Figure 4:
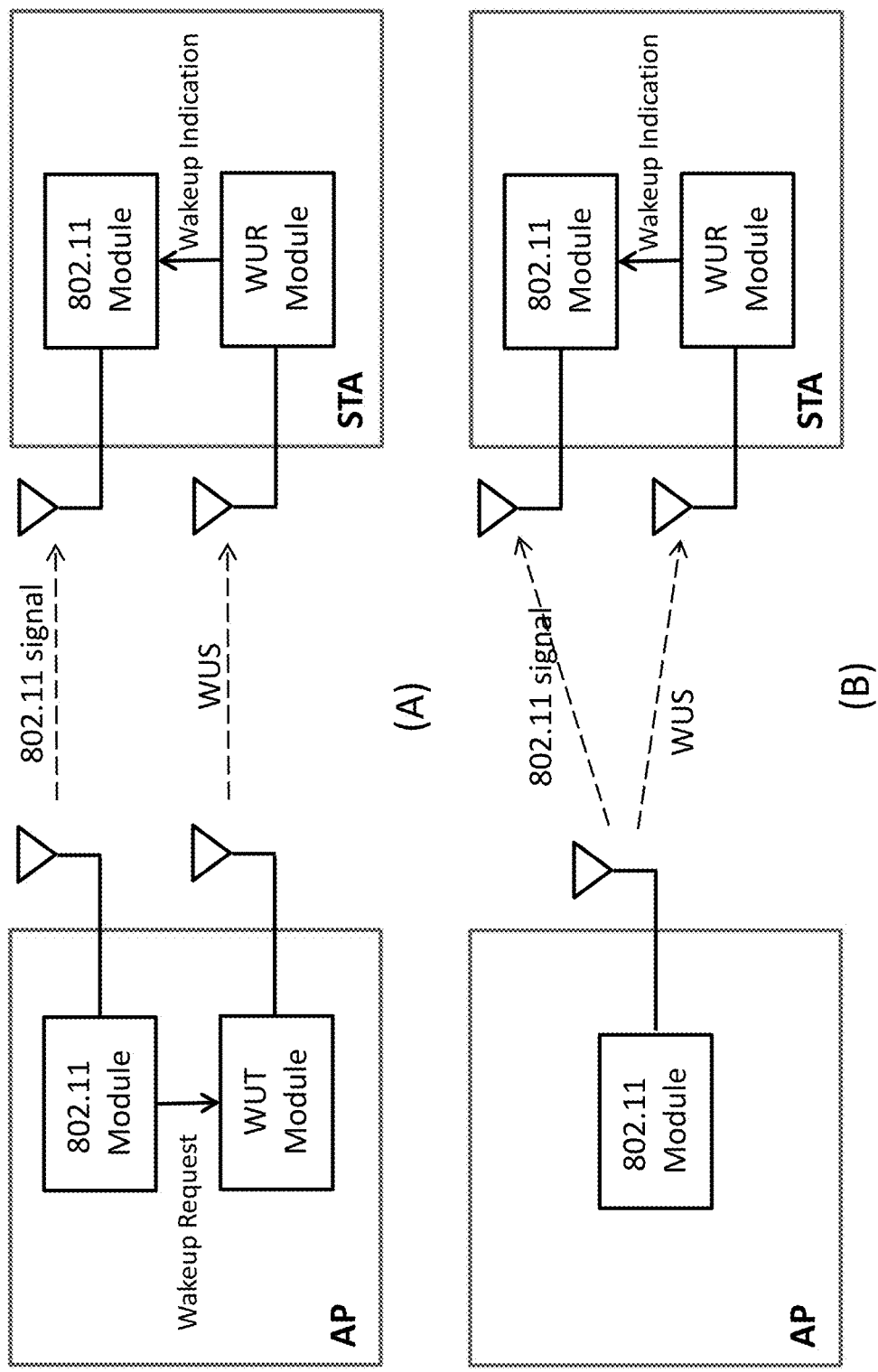
FIG. 4 shows an example of communication between the wake-up receiver and wake-up transmitter.

FIG. 4 shows an example of wireless device (STA) with WUR module communicating with the wireless network (AP) to receive the WUS.

In FIG. 4 (A), the wireless device AP contains a main wireless communication module based on the wireless technology such as 802.11 operating on wide bandwidth channel and the module of Wakeup Transmitter (WUT) operating on a narrow band channel. The WUT could be a logic entity in the AP. When the main wireless communication module wants to send the data or signal to the power saving device (STA) in the sleep state, the main wireless communication module will send the wake-up request command to the WUT first to ask WUT to send the WUS to the WUR of the power saving device. When the STA receives the WUS addressing to it, it will send a wakeup indication to the main wireless communication module for wake-up from the sleep mode. Once the main wireless communication module of STA is awake, it will start communication with the AP over wide bandwidth channel.

The WUS could be transmitted at the same frequency channel of the main wireless communication module (i.e. in-band operation), or different frequency channel from the operation channel of the main wireless communication module (i.e. out-band). If the WUS shares the same radio frequency channel with the main wireless communication module, the main wireless communication module may be used to send the WUS over the multiple narrow band channels (e.g., OFDM), shared with regular wideband signals in the time division.

FIGS. 5A-5B show an example of WUS signal format used for the communication between WUT and WUR modules.

FIG. 5A shows an example of a wireless WUS format 502 for communication between WUT and WUR modules over a single narrow band frequency channel. The WUS signal contains:

(a) WUS-Preamble field 504: this field contains a unique sequence which is to identify the WUS signal. It indicates the commencing of the WUS signal, and may be used for simple timing synchronization between WUR and WUT modules. When the WUR monitors the WUS on narrow band frequency channel and detects the WUS preamble, it can start to receive the following field of the signal. The WUS-Preamble could be set to a unique sequence within the BSS. Different BSS may have different sequence so that the WUR could distinguish WUS from its BSS or other BSS.

(b) WUR ID field 506: this field is used to identify the WUR module which is associated with the power saving device (STA). This field could be set to the AID directly or hashed AID of the power saving STA. When the WUR ID of received WUS matches with the AID of the power saving STA, the STA sends the wake-up indication to the main wireless communication module in the sleep mode.

(c) FCS field 508: this field is to provide error correction in decoding WUR ID field to reduce the probability of mis-detection of WUS.

The WUS transmissions over the narrow band frequency channel could be sequentially in inter frame space, WUS-IFS, which is the idle time between two consecutive WUS signals. The WUR uses the WUS-IFS time to separate WUS signals, and determine the starting point of WUS.

In order to reduce the implementation complexity and reduce the bandwidth requirement, the WUS could be modulated via On-Off-Key (OOK) over single carrier.

FIG. 5B shows another example of format 510 of WUS signal which is embedded within the 802.11 frame transmitted over wideband such as 20 Mhz channel bandwidth.

(a) The embedded WUS signal starts with the 802.11 preamble which includes L-STF, L-LTF and L-SIG fields. The 802.11 preamble is used for coexistence with 802.11 networks and identified by other 802.11 stations when WUS and other 802.11 signal are transmitted over the same channel (in-band).

(b) The wideband channel is divided into multiple sub-channels, each of which is a narrow band channel such as one sub-carrier of OFDM to carry WUS signal as shown in the format (A). Therefore, a single frame of WUS format (B) could be able to carry multiple WUS signals simultaneously to wake-up multiple power saving stations at the same time to enable multi-user communications.

Figure 6A:
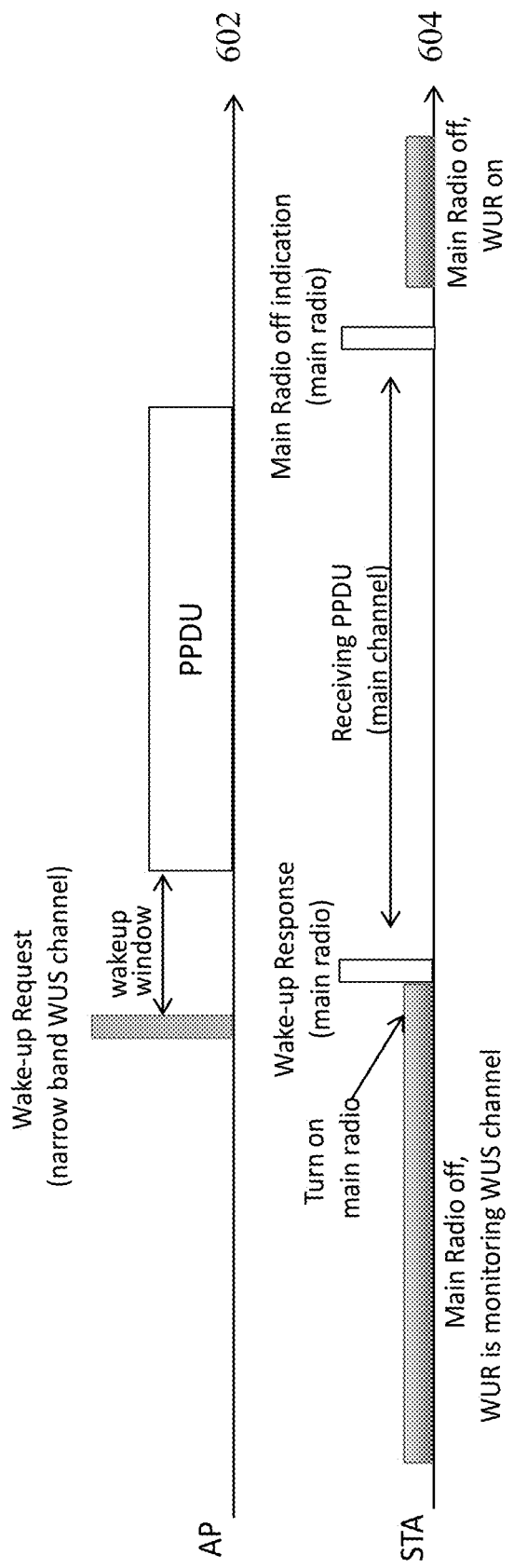
FIG. 6A shows an example of transmission procedure of wake-up signal over single narrow band channel.

FIG. 6A shows an example of transmission procedure of the wake-up request signal over the narrow band frequency channel. The timeline 602 shows operation of AP. The timeline 604 shows, along the same time, operation of an STA.

The main radio of power saving STA is in sleep mode when there is no data communication between the STA and AP after a certain time. Once the STA enters the sleep mode, the main wireless communication module is turned off to reduce the power consumption. The STA should inform or synchronize its state to the AP before entering the sleep mode. Meanwhile the WUR of the STA remains on and continues monitoring the transmission over WUS channel. The WUR could operate in the always-on mode or periodic-on mode to monitor WUS channel.

If the AP with WUT module has some buffered data for the power saving STA, it will send the wake-up request signal to the WUR over the WUS channel if the STA is in the sleep mode. Then the AP will enter the receiving mode to wait for the wake-up response sent from the main wireless communication module of STA over the main wireless channel within the wake-up window.

When the WUR of STA receives the WUS from the AP, it will send a wake-up indication to wake-up the main wireless communication module of STA from the sleep state to the wake-up state for transmitting the wake-up response signal over wideband wireless channel. Then STA and AP could start the normal wireless communications over the main radios.

The similar procedure could be used to wake-up multiple power saving STAs at same time via the embedded WUS in 802.11 frame over wideband carrier.

Figure 6B:
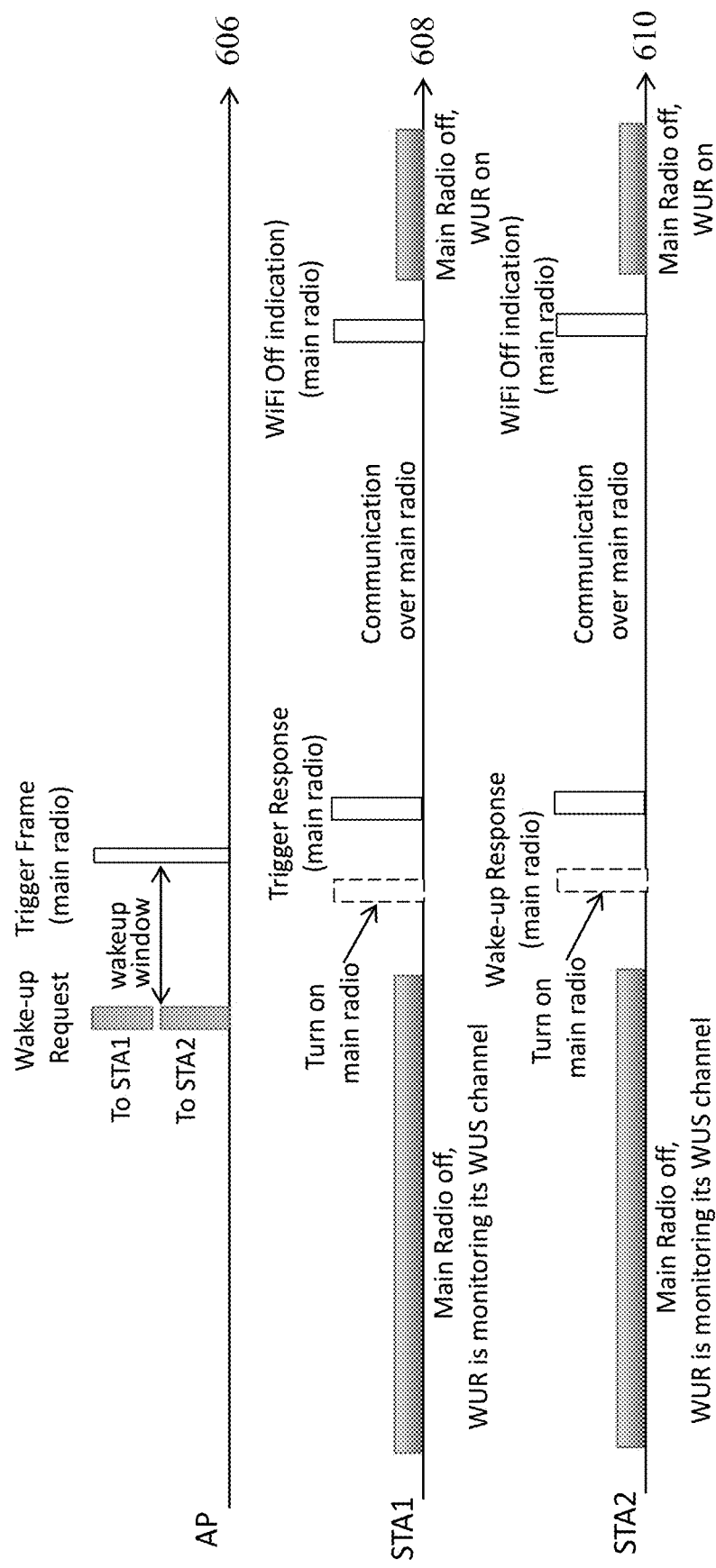
FIG. 6B shows an example of transmission procedure of wake-up signal over multiple narrow band channels simultaneously.

FIG. 6B shows an example of procedure of transmitting embedded wake-up request signals over OFDMA subchannels. The timeline 606 shows operation of AP. The timelines 608, 610 show, along the same time, operation of two different STAs. The AP with WUT sends an embedded WUS to multiple STAs in the sleep mode (i.e. STA1 and STA2 in the example) over wideband channel using OFDMA mechanism. When WURs of STAs receive the WUS embedded in IEEE802.11 frame, they will wake-up the main radio in the sleep mode and send the wake-up response within the wake-up window. As multiple wake-up responses from different STAs are mixed over the air, the AP may not be able to distinguish them. Therefore, the AP shall send a trigger frame (like MU-RTS) after wake-up window to the STAs in the wake-up state for further identifying them. Once the STAs in wake-up state receive the trigger frame addressing to them, they shall send the trigger response (like MU-CTS) frame back to the AP over the OFDMA sub-channel allocated in trigger frame. Then STAs and AP can proceed the normal communications over the main radio. After finishing communications over the main radio, the power saving STAs need to inform the AP about entering the sleep mode which it only remains WUR on. Therefore, if the AP would like further communicate with those STAs, the AP sends WUS to wake-up their main radio first.

Figure 7:
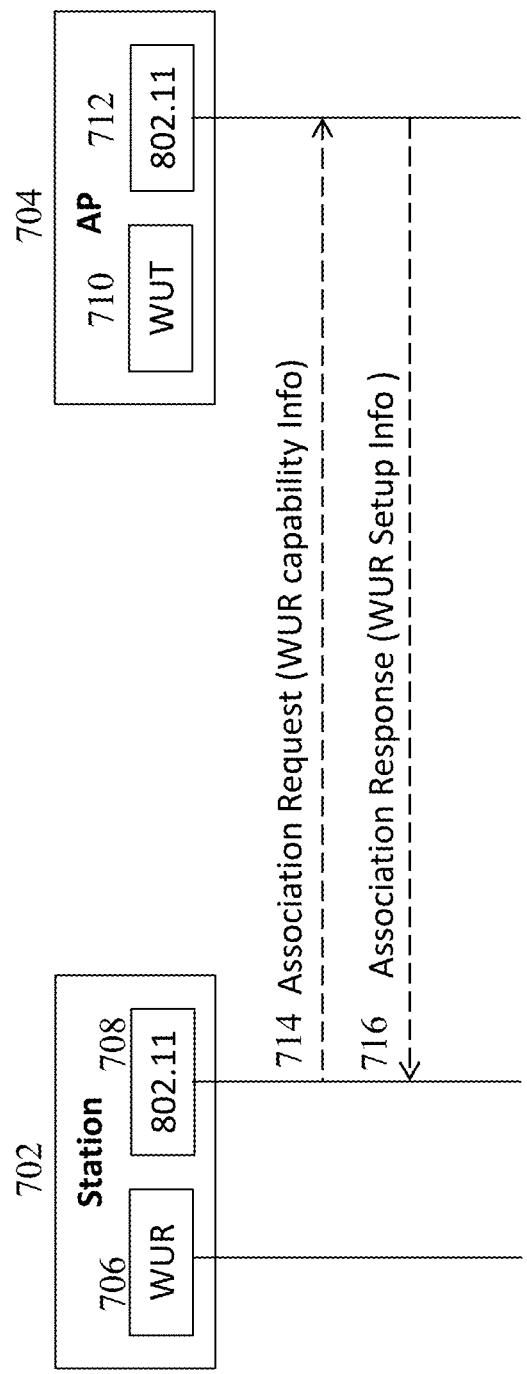
FIG. 7 shows an example of power saving STA and AP negotiating the WUR capability and configuration.

FIG. 7 shows the procedure of power saving STA 702 and AP 704 to negotiate with the wake-up capability. The STA 702 has two air interfaces, a wideband interface, e.g., 802.11 708, and a narrowband interface 706, as described herein. Similarly, the AP 704 may have corresponding wideband air interface 712 and a narrowband air interface 710. During the association, the WUR capable station transmits the association request message 714 with the WUR information to the WUT capable AP. The WUR capable information may include the WUR capability indication and supported operating channel for the WUS signal.

When the WUT capable AP receives the association request message with the WUR capability information and supports the WUR capability, the AP should respond in the association response message 716 with the WUR setup information, including:

(a) WUS operating channel that the WUR should operate on;

(b) WUS-preamble sequence unique to the BSS;

(c) WUR ID for the WUR of the power saving STA. The WUR ID may be same as AID or mapped to AID.

Otherwise, the AP shall send the association response with the indication of WUR un-supported.

Once the WUR capable STA receives the association response with WUR configuration, it enables WUR module to monitor WUS when the main wireless communication module (such as 802.11) is in the sleep mode. The main wireless communication module of the power saving STA may include the sleep state indication in the last message to the AP and automatically enter the sleep mode after a given period.

Figure 8:
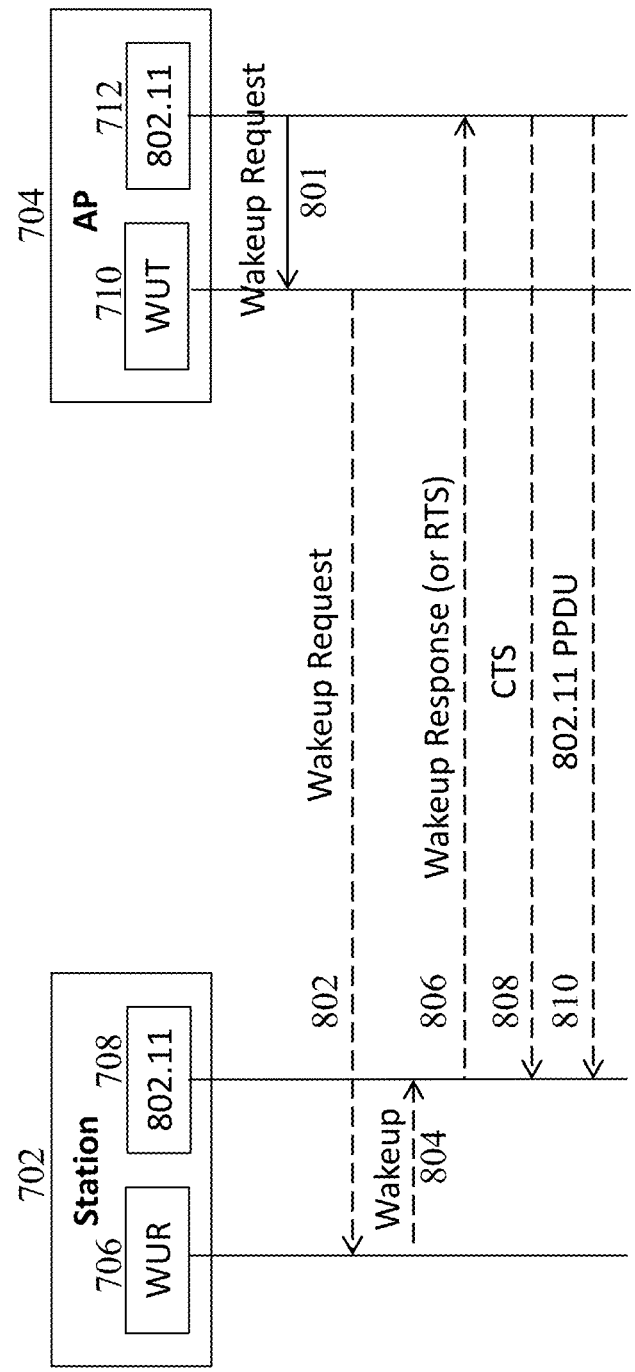
FIG. 8 shows an example of unicast wake-up transmission between the power saving STA and AP.

FIG. 8 shows an example of unicast wakeup signal to control the main wireless communication module of the power saving station.

The AP with WUT capability needs to send the buffered data to the WUR capable power saving STA. The main wireless communication module of the AP (i.e. 802.11) sends the internal signal of wakeup request 801 to the WUT to request sending the Wakeup Request signal 802 addressing to the power saving STA over the specified WUS channel. Then the AP will monitor the main wireless channel for the wake-up response 806 from the power saving STA.

After the WUR of STA receives the Wakeup Request, it then sends the wake-up indication 804 to turn on the main wireless communication module to respond with the Wakeup Response 806 or other message such as RTS over the main wireless channel, so that the power saving STA and AP could start normal communications. Then, the AP continues normal 802.11 operation by sending a clear to send signal 808 and a protocol data unit 810 that includes data to be communicated to the STA 702.

Figure 9:
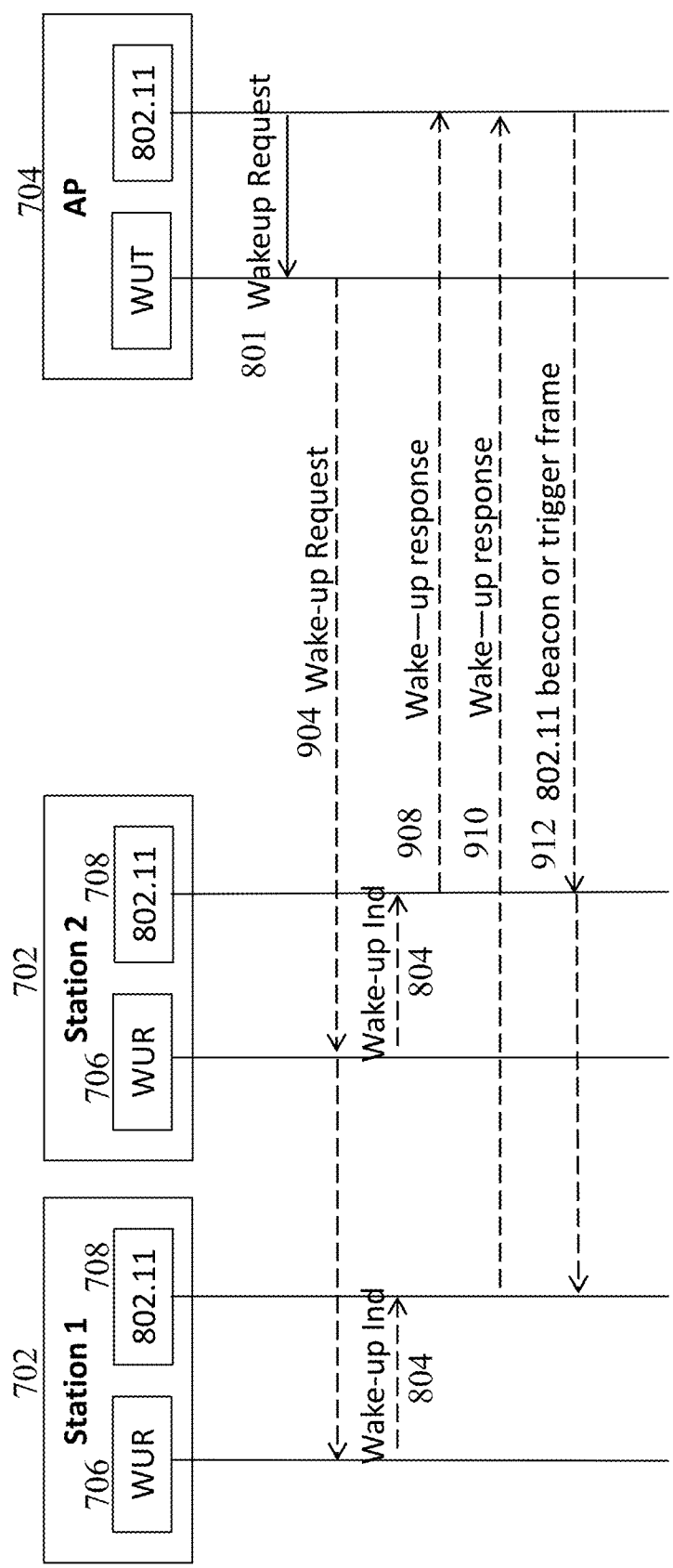
FIG. 9 shows an example of broadcast wake-up transmission between the power saving STA and AP.

FIG. 9 shows an example of AP sending a broadcast WUS to wake-up power saving STAs at same time.

When the AP with WUT capable wants to send a broadcast message to the power saving STAs in the BSS, it could send the Wake-up Request 904 to the WUT to request sending the broadcast WUS to WURs of power saving stations in the BSS. WUT of AP could set the WUR ID field of WUS to the broadcast address so that the WUS could be reached to WUR of power saving STAs in the BSS.

After AP sends out the broadcast WUS 904, it could send 802.11 beacon, trigger frame or other broadcast messages 912 to power saving stations after wake-up window. The AP may wait to receive wake-up responses 908, 910 from the STAs before broadcasting the broadcast message.

Figure 10:
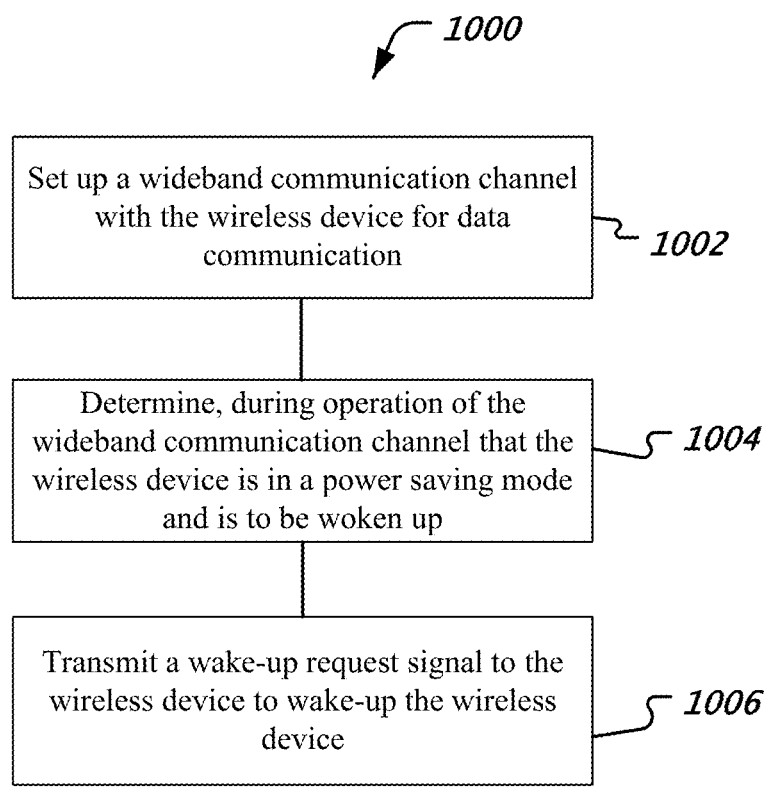
FIG. 10 shows an example flowchart for a method of wireless communication implemented by a network controller device.

FIG. 10 is a flowchart depiction of an example method 1000 of wireless communication implemented by a network controller such as the above-discussed AP in the 802.11 networks.

The method 1000 includes, at 1002, setting up a wideband communication channel with the wireless device for data communication. The wideband communication channel may use a well-known technology such as 802.11, and various ways to setting up such wireless networks is well-known in the art.

The method 1000 includes, at 1004, determining, during operation of the wideband communication channel that the wireless device is in a power saving mode and is to be woken up. The determination may be performed by the network controller maintaining a status table in its memory of all the wireless devices in the network, and which of these wireless devices are in sleep mode or are actively communicating in the network. For example, for each wireless device, the table may include an entry that may have a value of either "active" or "sleeping". The transition between these two values may be based on, e.g., receiving previously discussed wake-up response messages and/or direct or indirect (e.g., capabilities setting) indication from wireless device that they are entering sleep mode.

The method 1000 includes, at 1006, transmitting, upon the determining, over a narrowband communication channel having a narrowband communication bandwidth lower than that of the wideband communication channel, a wake-up request signal to the wireless device to wake-up the wireless device for communication over the wideband communication channel. The network controller, in general, not mind if a wireless device goes into an extended sleep period. Only when there is data that needs to go to the wireless device, and the data is either about to exceed either a buffering time budget or a buffering amount budget, the network controller may want to determine whether the device is awake, and if not, wake up the device so the data can be sent to the device without exceeding delay or buffer that stores the data.

As described in the present document, the wake-up request signal includes a preamble sequence which uniquely identifies the wake-up request signal as being for the wideband communication network, an identifier of the wireless device for whom the wake-up request signal is intended, and an error correction sequence facilitating error-free reception of the wake-up request signal.

In some embodiments, the network controller device may, after sending the wake-up request, wait for an amount of time to receive a confirmation on the wideband communication channel that the requested device has woken up. In some embodiments, the network controller may assume, even without an explicit message from the wireless device, that the wireless device is awake after a predetermined time period after the wake-up request was transmitted.

To achieve significant power savings, bandwidth of the narrowband channel may be selected to be much smaller than that of the wideband channel. For example, in some embodiments, the wideband channel may have approximately 20, 40 or 80 MHz bandwidth, while the narrowband channel may be at least an order of magnitude smaller, e.g., $1/10$th or $1/20$th or $1/40$th of the wideband channel. Even at such narrowband transmission rates, using a simple modulation scheme such as on-off keying, about 1 bit per Hz per second can be transmitted, and therefore 100 bits could be transmitted in 1 millisecond on the narrowband channel (assuming 1 MHz bandwidth), which may be sufficient to carry the entire wake-up request message. Furthermore, additional complexity and power reduction can be obtained knowing that the narrowband channel is a unidirectional channel—that is, in some embodiments, the network controller is transmit-only and the wireless device is a receive-only device of the narrowband channel.

Figure 11:
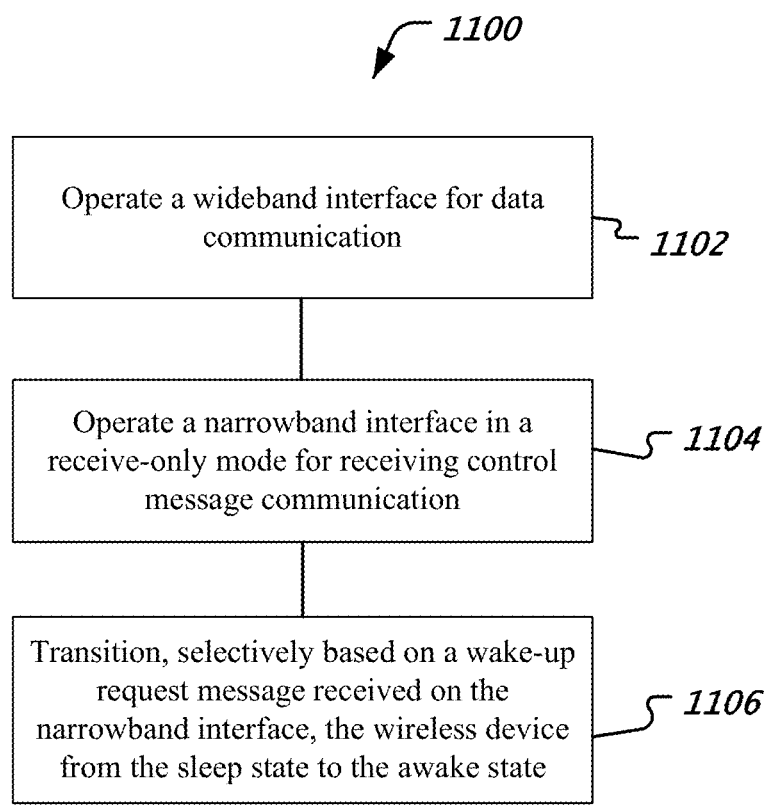
FIG. 11 shows an example flowchart for a method wireless communication implemented by a wireless device.

FIG. 11 is a flowchart depiction of a method 1100 of wireless communication implemented by a wireless device that is not acting as a network controller.

The method 1100 includes, at 1102, operating a wideband interface for data communication, wherein the wideband interface is operated in at least two states, including an awake state in which data transfer occurs over the wideband interface and a sleep state in which data transfer is disabled on the wideband interface.

The method 1100 includes, at 1104, operating a narrowband interface in a receive-only mode for receiving control message communication, wherein the narrowband interface operates at a bandwidth substantially lower than that of the wideband interface.

The method 1100 includes, at 1106, transitioning, selectively based on a wake-up request message received on the narrowband interface, the wireless device from the sleep state to the awake state.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of wireless communication, implemented at a wireless controller device in a wireless network comprising a wireless device, comprising:
    setting up a wideband communication channel with the wireless device for data communication;
    determining, during operation of the wideband communication channel that the wireless device is in a power saving mode and is to be woken up; and
    transmitting, upon the determining, over a narrowband communication channel having a narrowband communication bandwidth lower than a wideband communication bandwidth of the wideband communication channel, a wake-up request signal to the wireless device to wake-up the wireless device for communication over the wideband communication channel,
    wherein the wake-up request signal comprises:
        a preamble sequence that is configured to be detected using a clear channel assessment (CCA) mechanism which uniquely identifies the wake-up request signal as being for a basic service set (BSS) of the wireless network,
        an identifier of the wireless device for whom the wake-up request signal is intended, and
        an error correction sequence facilitating error-free reception of the wake-up request signal.

2. The method of claim 1, further including:
    sending, after a time window after transmitting the wake-up request, a data packet to the wireless device over the wideband communication channel.

3. The method of claim 2, wherein the sending is selectively performed based on receiving a confirmation message from the wireless device that the wireless device has woken up.

4. The method of claim 1, wherein the narrowband communication bandwidth is less than 1/10th of the wideband communication bandwidth.

5. The method of claim 1, wherein the wideband communication channel and the narrowband communication channel operate in non-overlapping frequency spectrums.

6. The method of claim 1, wherein the wideband communication channel and the narrowband communication channel operate in overlapping frequency spectrums.

7. The method of claim 1, wherein the transmitting the wake-up request signal includes using on-off keying modulation.

8. The method of claim 1, wherein the wireless network includes another wireless device, the method further including:

transmitting another wake-up request signal to the another device, wherein the wake-up request signal and the another wake-up request signal are separated by a pre-defined time gap.

9. A wireless controller apparatus operable in a wireless network that includes a wireless device, comprising:
a memory for storing instructions;
a processor;
a wideband air interface for communication over a wideband communication channel; and
a narrowband air interface for communication over a narrowband communication channel,
wherein the processor reads instructions from the memory and performs operations of:
determining, during operation of the wideband communication channel that the wireless device is in a power saving mode and is to be woken up; and
performing transmission, upon the determining, over the narrowband air interface, a wake-up request signal to the wireless device to wake-up the wireless device for communication over the wideband air interface,
wherein the wake-up request signal comprises:
a preamble sequence that is configured to be detected using a clear channel assessment (CCA) mechanism which uniquely identifies the wake-up request signal as belonging to a basic service set (BSS) of the wireless network,
an identifier of the wireless device for whom the wake-up request signal is intended, and
an error correction sequence facilitating error-free reception of the wake-up request signal, and
wherein a communication bandwidth of the narrowband air interface is lower than a communication bandwidth of the wideband air interface.

10. The apparatus of claim 9, wherein the processor further performs:
sending, after a time window after transmitting the wake-up request, a data packet to the wireless device over the wideband air interface.

11. The apparatus of claim 10, wherein the sending is selectively performed based on receiving a confirmation message from the wireless device that the wireless device has woken up.

12. The apparatus of claim 9, wherein the wideband air interface and the narrowband air interface share a same antenna for transmission/reception.

13. The apparatus of claim 9, wherein the wideband air interface and the narrowband air interface operate in non-overlapping frequency spectrums.

14. The apparatus of claim 9, wherein the wideband air interface and the narrowband air interface operate in overlapping frequency spectrums.

15. The apparatus of claim 9, wherein the narrowband air interface uses on-off keying modulation.

16. The apparatus of claim 9, wherein the wideband air interface uses an 802.11-compliant air interface.

17. A method of wireless communication, implemented by a wireless device for operation in a wireless network, comprising:
operating a wideband interface for data communication, wherein the wideband interface is operated in at least two states, including an awake state in which data transfer occurs over the wideband interface and a sleep state in which data transfer is disabled on the wideband interface;
operating a narrowband interface in a receive-only mode for receiving control message communication, wherein the narrowband interface operates at a bandwidth substantially lower than that of the wideband interface; and
transitioning, selectively based on a wake-up request message received on the narrowband interface, the wireless device from the sleep state to the awake state,
wherein the wake-up request message comprise a preamble sequence that is configured to be detected using a clear channel assessment (CCA) mechanism which uniquely identifies the wake-up request message as being for a basic service set (BSS) of the wireless network.

18. The method of claim 17, further including:
receiving, after a time window after transmitting the wake-up request, a data packet to the wireless device over the wideband communication channel.

19. The method of claim 17, further including:
transmitting, within a predetermined time of receiving the wake-up request, a confirmation message over the wideband interface.

20. The method of claim 17, wherein the narrowband communication bandwidth is less than 1/10th of the wideband communication bandwidth.

21. The method of claim 17, wherein the wideband communication channel and the narrowband communication channel operate in non-overlapping frequency spectrums.

22. The method of claim 17, wherein the wideband communication channel and the narrowband communication channel operate in overlapping frequency spectrums.

23. The method of claim 17, wherein the receiving the wake-up request signal includes using on-off keying modulation.

24. The method of claim 17, wherein the wake-up request message further includes a message field and an error checksum field, and wherein the transitioning includes transitioning only when the preamble sequence correctly identifies the wireless network, the message field correctly identifies the wireless device and the error checksum field indicates no errors in receiving the wake-up request message.

25. A wireless communication apparatus, implemented by a wireless device for operation in a wireless network, comprising:
a processor; and
a memory with instructions thereon, wherein the instructions upon execution by the processor cause the processor to:
operate a wideband interface for data communication, wherein the wideband interface is operated in at least two states, including an awake state in which data transfer occurs over the wideband interface and a sleep state in which data transfer is disabled on the wideband interface;
operate a narrowband interface in a receive-only mode for receiving control message communication, wherein the narrowband interface operates at a bandwidth substantially lower than that of the wideband interface; and
transition, selectively based on a wake-up request message received on the narrowband interface, the wireless device from the sleep state to the awake state,
wherein the wake-up request message includes a preamble sequence that is configured to be detected using a clear channel assessment (CCA) mechanism that uniquely identifies the wake-up request message as being for a basic service set (BSS) of the wireless network.

26. The apparatus of claim 25, further including:

receiving, after a time window after transmitting the wake-up request, a data packet to the wireless device over the wideband communication channel.

27. The apparatus of claim 25, wherein the instructions upon execution by the processor further cause the processor to:

transmit, within a predetermined time of receiving the wake-up request, a confirmation message over the wideband interface.

28. The apparatus of claim 25, wherein the narrowband communication bandwidth is less than 1/10th of the wideband communication bandwidth.

29. The apparatus of claim 25, wherein the wideband communication channel and the narrowband communication channel operate in non-overlapping frequency spectrums.

30. The apparatus of claim 25, wherein the wideband communication channel and the narrowband communication channel operate in overlapping frequency spectrums.

31. The apparatus of claim 25, wherein the transmitting the wake-up request signal includes using on-off keying modulation.

32. The apparatus of claim 25, wherein the wake-up request message further includes a message field and an error checksum field, and wherein the transitioning includes transitioning only when the preamble sequence correctly identifies the wireless network, the message field correctly identifies the wireless device and the error checksum field indicates no errors in receiving the wake-up request message.

* * * * *